(12) United States Patent
Voisine

(10) Patent No.: US 8,810,077 B2
(45) Date of Patent: Aug. 19, 2014

(54) FAULT TOLERANT SERVICE SWITCH OPERATION IN A UTILITY METER

(75) Inventor: John T. Voisine, Lafayette, IN (US)

(73) Assignee: Landis+Gyr, Inc., Lafayette, IN (US)

( * ) Notice: Subject to any disclaimer, the term of this patent is extended or adjusted under 35 U.S.C. 154(b) by 968 days.

(21) Appl. No.: 12/911,715

(22) Filed: Oct. 25, 2010

(65) Prior Publication Data

US 2011/0121664 A1    May 26, 2011

Related U.S. Application Data

(63) Continuation-in-part of application No. 12/832,983, filed on Jul. 8, 2010, now abandoned.

(60) Provisional application No. 61/223,925, filed on Jul. 8, 2009.

(51) Int. Cl.
*H01H 9/54* (2006.01)

(52) U.S. Cl.
USPC ......................................................... 307/140

(58) Field of Classification Search
USPC ......................................................... 307/140
See application file for complete search history.

(56) References Cited

U.S. PATENT DOCUMENTS

2006/0232433 A1* 10/2006 Holle et al. .................... 340/667

* cited by examiner

*Primary Examiner* — Robert L. Deberadinis
(74) *Attorney, Agent, or Firm* — Maginot, Moore & Beck LLP

(57) ABSTRACT

An arrangement for controllably disconnecting a utility power service from a load includes a meter housing, a service switch, an electrically-powered source of motive force, and energy storage device, and a charging circuit. The meter housing includes metrology circuitry configured to generate metering information regarding electrical power provided to the load. The service switch is configured to controllably interrupt a connection between the utility power service and the load. The electrically-powered source of motive force is configured to cause the service switch to controllably interrupt the connection between the utility power service and the load. The energy storage device is operably connected to provide power to the electrically-powered source of motive force. The charging circuit is configured to provide charging energy to the energy storage device. The energy storage device is configured to provide sufficient power to the electrically-power source of motive force after being at least partially charged by the charging circuit. The arrangement further includes a control circuit configured to provide a first signal to a first switch operably connecting the energy storage device to the electrically powered source of motive force, and to provide a second signal to a second switch operably connecting the charging circuit to the energy storage device. The control circuit is configured to receive a disconnect command signal, and to provide the second signal and the first signal in sequence responsive to receiving the disconnect command signal.

6 Claims, 3 Drawing Sheets

FAULT TOLERANT SERVICE SWITCH OPERATION IN A UTILITY METER

This application is a continuation-in-part of U.S. Ser. No. 12/832,983, filed Jul. 8, 2010, which in turn claims the benefit of U.S. Provisional Patent Application Ser. No. 61/223,925, filed Jul. 8, 2009, both of which is incorporated herein by reference.

FIELD OF THE INVENTION

The present invention relates to utility meters having electrical service disconnect features.

BACKGROUND

Electrical service providers such as electrical utilities employ electricity meters to monitor energy consumption by customers (or other entities). Electricity meters track the amount of energy consumed by a load (e.g. the customer), typically measured in kilowatt-hours ("kwh"), at each customer's facility. The service provider uses the consumption information primarily for billing, but also for resource allocation planning and other purposes.

Electrical power is transmitted and delivered to load in many forms. For example, electrical power may be delivered as polyphase wye-connected or delta-connected power or as single phase power. Such various forms are known as service types. Different standard electricity meter types, known as meter forms, are used to measure the power consumption for the various service types. The commonly used meter forms in the United States include those designated as 2S, 3S, 5S, 45S, 6S, 36S, 9S, 16S, 12S and 25S meter forms, which are well known in the art.

Electrical service providers have historically billed for electrical service in arrears, using information stored within the electricity meter to determine the amount of each invoice. In a typical operation, the electricity meter stores a value representative of the amount of energy consumed in a mechanical or electronic accumulation register. From time to time, the electrical service provider obtains the value of the register and bills the customer accordingly. For example, a meter reader employed by the service provider may, each month, physically read the register value off of a meter display. The service provider then employs the obtained register value to determine the amount of electricity consumed over the month and bills the customer for the determined amount.

A problem with the above-described operation of electrical service providers arises from the fact that some customers are frequently delinquent in or, in default of, payments for electricity consumption. Because electrical service is billed in arrears, delinquent payments can result in significant losses for the service provider. In many cases, the utility must interrupt power to prevent additional losses. However, interrupting the delivery of electrical power has historically been an expensive and significant event. Typically, a technician must be dispatched to the customer's residence, or in the vicinity thereof, to physically disconnect the power. Accordingly, while the electrical service provider can justify physically disconnecting the power to the customer's facility after several months of default, physical disconnection is not practical in circumstances in which customers are merely delinquent, or can only pay portions of their bills. In particular, the cost an effort of sending a technician out to disconnect electrical service is wasted if the customer pays a day or two later, thereby requiring another service call to restore service.

One method of controlling losses associated with delinquent customers is to require prepayment for services. In prepayment arrangements, customers use prepaid debit cards or credit cards to "purchase" energy in advance. When the purchased energy has been consumed, the electrical service is disconnected. Thus, the service provider is not exposed to extended periods of electrical service for which no payment may be provided. Another method of handling delinquent customers is to intermittently interrupt power to delinquent customers until the past due payments are made. Intermittent interruptions tend to reduce the amount of energy consumed by the delinquent payor, thus advantageously reducing utility provider losses while also reducing bills to the delinquent payor.

Each of the above methods, however, typically requires the ability to disconnect and/or reconnect the customer's power without a technician service call to the customer's location. For example, in a prepayment scenario, the service provider must have a method of disconnecting power once the prepaid amount of energy has been consumed. Similarly, the intermittent interruption technique requires frequent connection and disconnection of the electrical service.

One technique for automated or remote service disconnection is to employ a service switch device within an electricity meter. The service switch is a relay or other switching element that controllably disconnects and re-connects the utility power lines to the customer's feeder lines, thereby controllably interrupting power to the customer's facility. In some cases, the service switch is tripped by a remote device that communicates with the electricity meter circuitry through a modem, radio or the like. Alternatively, such as in the case of prepayment, the meter itself may be programmed to disconnect and reconnect electrical service under certain circumstances. In some situations, the meter may disconnect and restore electrical service through a combination of local programming and remote commands.

Thus, the inclusion of a service switch within a meter facilitates various methods and techniques for providing improved electrical service to parties despite poor payment records. Such methods and techniques advantageously do not require a permanent disconnection by a field technician.

The conveniences provided by a service switch also extends beyond use in connection with delinquent payors. For example, electrical energy rationing may be implemented using techniques enabled by the service switch. Moreover, service disconnect features are often employed within so-called "Smart Meters". The term "Smart Meter" has been used to describe electricity metering systems that use a wide area network (WAN) or the like to enable communication and control over networks of meters. The WAN is used to communicate with "Smart Meters" for purposes of obtaining energy information and to operate the service switch. The WAN can also be used to reprogram the electricity meter. Communication with the "Smart Meter" is an essential element in managing the electrical power grid. An essential element of the "Smart Grid" is the "Smart Meter".

Nevertheless, various issues that arise from the use of a service switch have not been adequately addressed in the prior art. In particular, because an open service switch leaves a customer without electrical power, it is important that false triggering does not occur. More specifically, it can be possible for the service switch under certain failure conditions to open when an opening operation was never intended. Since a service switch opening removes all power from being supplied to the residence, an unintended opening operation is very undesirable.

There is a need, therefore, for an arrangement for providing service disconnect in an electricity meter that provides increased protection against accidental operation of the switch.

SUMMARY

At least some embodiments of the present invention address the above-referenced issue by implementing multiple specific operations before opening a switch.

One embodiment is an arrangement for controllably disconnecting a utility power service from a load that includes a meter housing, a service switch, an electrically-powered source of motive force, and energy storage device, and a charging circuit. The meter housing includes metrology circuitry configured to generate metering information regarding electrical power provided to the load. The service switch is configured to controllably interrupt a connection between the utility power service and the load. The electrically-powered source of motive force is configured to cause the service switch to controllably interrupt the connection between the utility power service and the load. The energy storage device is operably connected to provide power to the electrically-powered source of motive force. The charging circuit is configured to provide charging energy to the energy storage device. The energy storage device is configured to provide sufficient power to the electrically-power source of motive force after being at least partially charged by the charging circuit.

The arrangement further includes a control circuit configured to provide a first signal to a first switch operably connecting the energy storage device to the electrically powered source of motive force, and to provide a second signal to a second switch operably connecting the charging circuit to the energy storage device. The control circuit is configured to receive a disconnect command signal, and to provide the second signal and the first signal in sequence responsive to receiving the disconnect command signal.

The above-described features and advantages, as well as others, will become more readily apparent to those of ordinary skill in the art by reference to the following detailed description and accompanying drawings.

DETAILED DESCRIPTION

Figure 1:
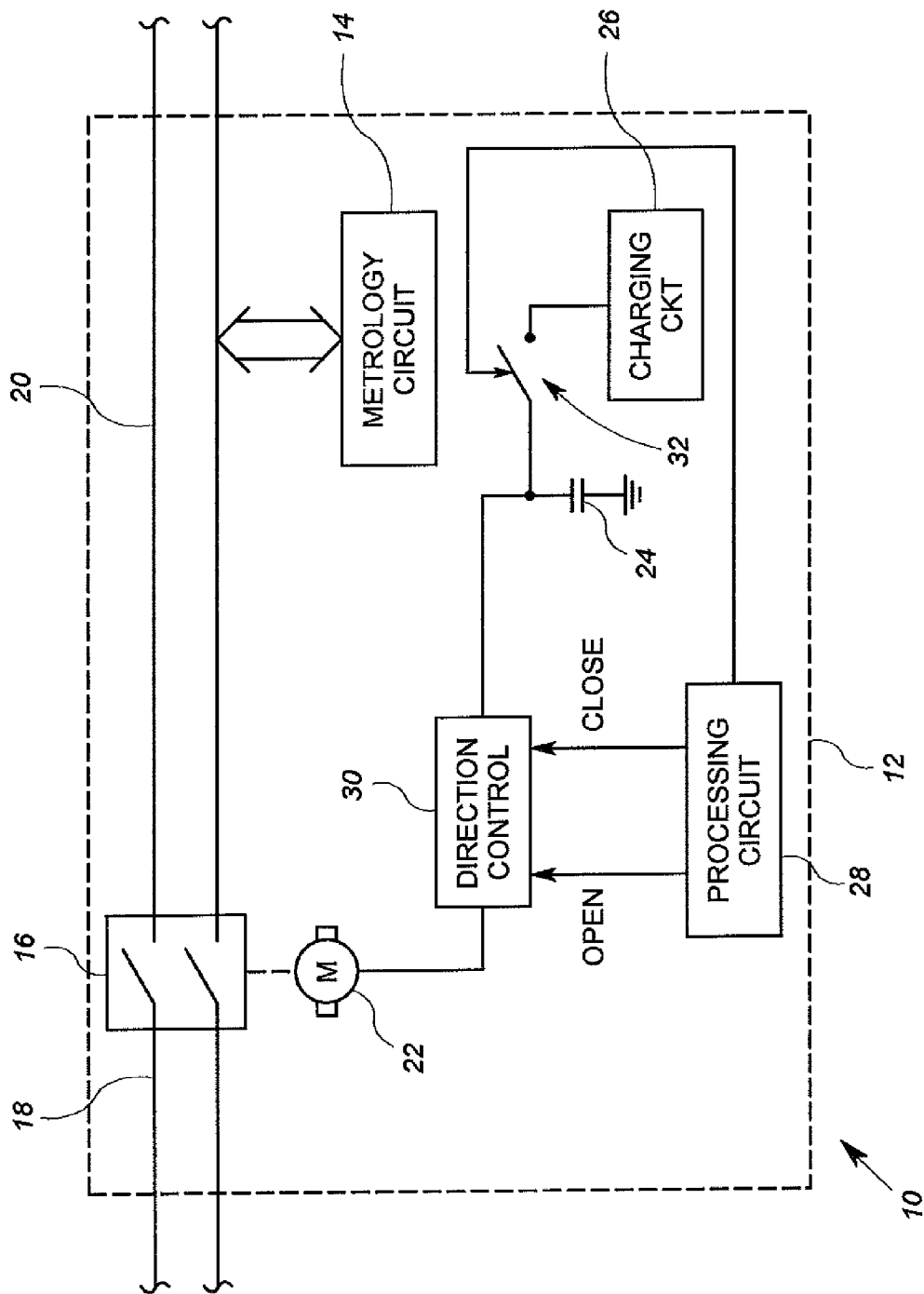
FIG. 1 is a schematic block diagram of an arrangement according to a first exemplary embodiment of the invention.

FIG. 1 shows an arrangement 10 for controllably disconnecting a utility power service from a load. The arrangement 10 includes a utility meter housing 12 in which is supported metrology circuitry 14 that is configured to generate metering information regarding electrical power provided to the load. The electric utility, not shown, provides electrical power via line side conductors 18 to that arrangement 10. The load side conductors or feeder lines 20 distribute the power received from the line side conductors 18 to the load, not shown. The arrangement 10 further includes a service switch 16, an electrically powered source of motive force 22, an energy storage device 24, a charging circuit 26, a processing or control circuit 28 and a direction control circuit 30, all of which are supported in or on the housing 12. It will be appreciated that the housing 12 further can support other meter circuitry, not shown in FIG. 1.

The metrology circuit 14 is any suitable circuit that detects, measures, and determines one or more electricity and/or electrical energy consumption values based on energy flowing from the line-side conductors 18 to the load-side conductors 20. Such circuits are known in the art and can take many forms. A non-limiting example of a suitable metrology circuit is described below in connection with FIG. 2.

The service switch 16 is a relay or other switch configured to controllably interrupt a connection between the utility power service and the load. To this end, the service switch 16 has terminals connected in series between the line side power conductors 18 and the load side power conductors 20. The electrically-powered source of motive force 22 has an output that is configured to cause the service switch 16 to controllably interrupt the connection between the conductors 18 and 20. In the embodiment described herein, the electrically-powered source of motive force 22 is a DC motor.

In order to operate the source of motive force 22, an energy storage device 24 is configured to provide power thereto. In particular, while the meter in which the arrangement 10 is disposed also contains a power supply, not shown in FIG. 1, the normal meter power supply lacks sufficient power to cause the source of motive force 22 to open the switch 16. Accordingly, the energy storage device 24 acts as a temporary power boost or source that energizes the motive force device 22 sufficiently to open the switch 16. To this end, the energy storage device 24 may suitably be one or more capacitors, and preferably super-capacitors.

Figure 3:
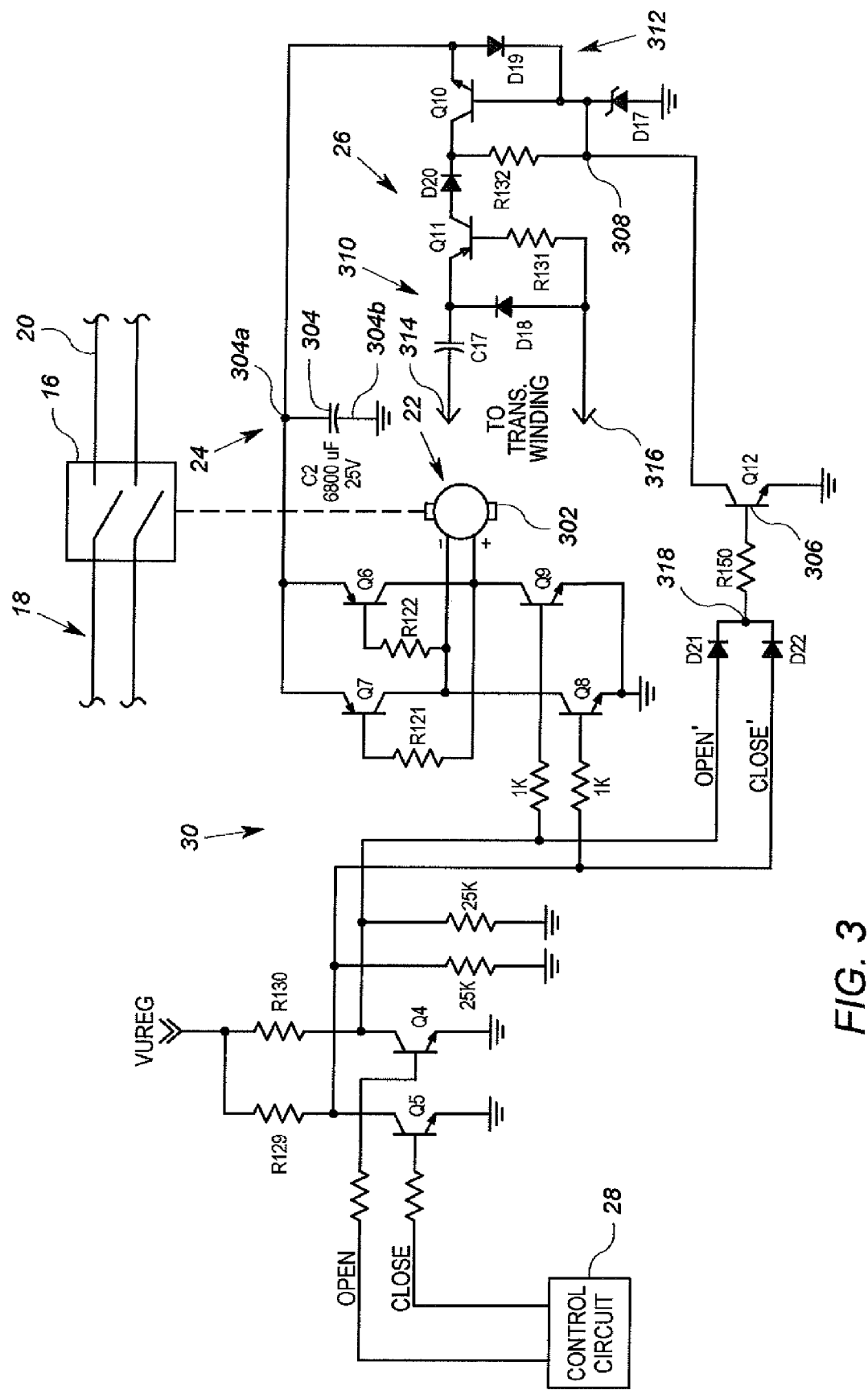
FIG. 3 is a schematic diagram of an arrangement according to another exemplary embodiment of the invention.

The charging circuit 26 is a circuit configured to provide a charging current to the energy storage device 24. Such circuits may take many forms. The charging circuit 26 is operably coupled to the energy storage device 24 via a switch 32. A non-limiting example of a suitable charging circuit is shown in FIG. 3, discussed further below. In this embodiment, the energy storage device 24 is configured to provide sufficient power to the electrically-powered source of motive force 22 only after being at least partially charged by the charging circuit 26.

The direction control circuit 30 controllably connects the energy storage device 24 to the source of motive force 22. More specifically, the direction control circuit 30 is operably coupled to controllably provide current from the energy storage device 24 to the source of motive force 22 in two modes. In the first mode, the direction control circuit 30 provides current that causes the source of motive force 22 to rotate in a first direction (to open switch 16), and in the second mode the direction control circuit 30 provides current that causes the source of motive force 22 to rotate in a second direction (to close switch 16). To this end, the direction control circuit 30 includes at least a first switch in the form of a transistor switch, not shown in FIG. 1. FIG. 3 shows a non-limiting example of a suitable direction control circuit. However, it will be appreciated that the direction control circuit 30 need not take any specific format, so long as it includes a switch that can be controllably operated to connect the energy storage device 24 to the source of motive force 22 to at least cause the source of motive force 22 to open the switch.

The control circuit 28 is operably coupled to the direction control circuit 30 to cause the direction control circuit 30 to operate in the first mode, the second mode, or a third mode in which the energy storage device 24 is operably disconnected from the source of motive force 22. To this end, the control circuit 28 is configured to provide an OPEN signal to the direction control circuit 30 (and at least one switch thereof) to cause operable connection of the energy storage device 24 to the electrically powered source of motive force 22 in the first mode. The control circuit 28 is further configured to provide a CLOSE signal to the direction control circuit 30 to cause operable connection of the energy storage device 24 to the electrically powered source of motive force 22 in the second mode.

The control circuit 28 is further operably coupled to the switch that controllably and operably connects the energy storage device 24 to the charging circuit 26. The switch 32 may suitably be an electronic device that operably connects the charging circuit 26 to the energy storage device 24. By "operably connects", it means that the switch 32 causes the charging circuit 26 to provide charging current to the energy storage device 24. The switch 32 also controllably disconnects the charging circuit 26 from the energy storage device 24 by substantially preventing current from flowing from the charging circuit to the storage device 24. Controllably disconnecting can include disabling the output of the charging circuit 26. In such a case, controllably connecting can include enabling a previously disabled output of the charging circuit 26. FIG. 3 shows a non-limiting example of the switch 32.

The control circuit 28 is configured to provide a signal to the switch 32 operably connecting the charging circuit 26 to the energy storage device 24.

The control circuit 28 is further configured to receive a disconnect command signal, for example, from a remote or external force through another circuit, not shown. The control circuit 28 is configured to provide, in sequence, the signal to the charging circuit 26, and then the OPEN signal to the direction control circuit 30, responsive to receiving the disconnect command signal. Conversely, the control circuit 28 is configured to provide, in sequence, the signal to the charging circuit 26, and then the CLOSE signal to the direction control circuit 30, responsive to a restore or reconnect command.

In normal energy delivery operation, the service switch 16 is closed, and the utility thereby provides electricity to the load via the line-side conductors 18 and the load-side conductors 20. The metrology circuit 14 senses or otherwise measures the electrical current flowing through the load-side conductors 20 and generates metering information therefrom. In such normal operation, the switch 32 is open, thereby operably disconnecting the charging circuit 26 form the energy storage device 24. Similarly, the direction control circuit 30 is configured such that neither an opening current nor a closing current is provided to source of motive force 22.

From time to time, it may be necessary for the electrical service to be disconnected from the load. In such a case, the control circuit 28 receives a command signal (i.e. a data signal with instruction data) from an external source indicating that the service is to be disconnected. To this end, the control circuit 28 is operably connected to a communication circuit, not shown, that receives signals from a remote transmitter. However, in a prepaid meter configuration, the control circuit 28 may generate the command signal internally upon determining that a prepaid amount of energy has been consumed.

Responsive to the command signal, the control circuit 28 generates a signal causing the switch 32 to operably connect the charging circuit 26 to the charge storage device 24. As a consequence, the charging circuit 26 charges the previously discharged charge storage device 24. After a short time sufficient to allow the charge storage device 24 to be charged, the control circuit 28 provides the OPEN signal to the direction control circuit 30. The OPEN signal causes the direction control circuit 30 to connect the charge storage device 24 to the source of motive force 22 such that the source of motive force 22 rotates in an "opening" direction. Such rotation causes the switch 16 to move from the closed state to the open state.

Once the switch 16 is open, electrical energy cannot flow to the load-side conductor 20 from the line-side conductors 18. Thus, the electrical service has been disconnected from the load.

Once the disconnect operation is complete, the control circuit 28 removes the control signals from the direction control circuit 30 and the switch 32. As a consequence, the source of motive force 22 is disconnected from the energy storage device 24, and the energy storage device 24 is disconnected from the charging circuit 26.

At some subsequent time, the control circuit 28 starts a process to reconnect or restore the electrical service to the load. The restoration process may commence responsive to a newly received command from an external source. Alternatively, software within the control circuit 28 may generate the command based on a predetermined amount of time passing since the disconnection, or based on receipt of information indicating further prepayment for services.

Responsive to the command signal, the control circuit 28 generates a signal causing the switch 32 to operably connect the charging circuit 26 to the charge storage device 24. As a consequence, the charging circuit 26 charges the previously discharged charge storage device 24. After a short time sufficient to allow the charge storage device 24 to be charged, the control circuit 28 provides a signal to the direction control circuit 30 that causes the direction control circuit 30 to connect the charge storage device 24 to the source of motive force 22 such that the source of motive force 22 rotates in a "closing" direction. Such rotation causes the switch 16 to move from the open state to the closed state.

Once the switch 16 is closed, electrical energy again flows to the load-side conductor 20 from the line-side conductors 18. Thus, the load has its electrical service restored.

The above-described design thus requires multiple control signals and operations to open the switch 16. A first command is required to charge the energy storage device 24, and a second command is required to connect the energy storage device 24 to the source of motive force 22. Accordingly, it can be appreciated that accidental opening of the switch would require the coincidence of two independent circuit malfunctions, each of which very unlikely on its own. For example, if some malfunction inadvertently causes the energy storage device 24 to be connected to the source of motive force 22, then switch 16 would not open because the energy storage device 24 is not normally in the charged state. Conversely, if some malfunction inadvertently causes the charging circuit 26 to be connected to the energy storage device 24, then the switch 16 would not be connected to the energy storage device 24 and the switch 16 could not open.

Figure 2:
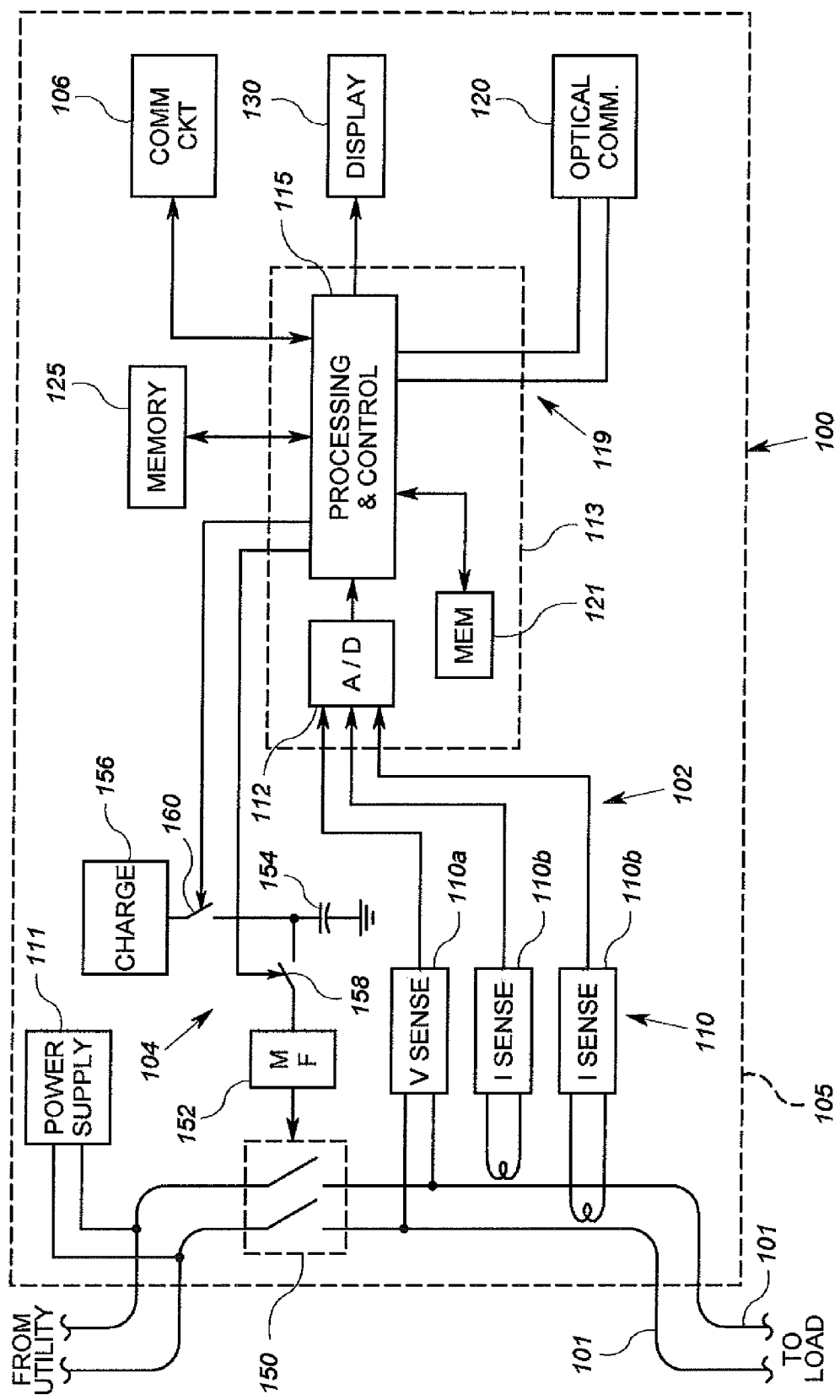
FIG. 2 is a schematic block diagram of an electricity meter according to a second exemplary embodiment of the invention.

FIG. 2 shows in further detail an exemplary meter 100 that incorporates a fault tolerant disconnect arrangement similar to that of FIG. 1. The meter 100 includes a housing 105 in which are disposed a metrology circuit 102, a service switch arrangement 104, a remote communication circuit 106, an optical communication circuit 120, data storage 125 and a display 130. The metrology circuit 102 further includes a sensor circuit 110, an A/D conversion unit 112, and at least a portion of a processing and control ("P&C") circuit 115.

It will be appreciated that in the exemplary embodiment, the P&C circuit 115 is disposed within a commercially available chip package 113 that includes the A/D conversion unit 112 and other circuitry normally associated with an electronic meter, such as memory 121, and clock circuitry, not shown.

The commercially available chip package 113 may suitably be the Teridian TDK71M6513 measurement chip.

Referring now to the housing 105, the housing 105 may take any suitable form, and is generally configured to withstand a wide range of environmental conditions. The housing 105 also provides at least some protection against environmental conditions to the various elements disposed therein. Suitable housings for utility meters are well-known in the art.

As discussed above, the metrology circuit 102 includes the sensor circuit 110, as well as an A/D conversion unit 112 and the P&C circuit 115. The sensor circuit 110 in one embodiment includes voltage sensors 110a and current sensors 110b that are operably coupled to detect voltage and current signals representative of voltage and current provided to a load, and to generate measurement signals therefrom. In particular, the measurement signals generated by the sensor circuit 110 are analog signals each having a waveform representative of the voltage and current provided to the load. A suitable example of a voltage sensor 110a includes a resistive voltage divider that is operably coupled to the power lines 101. A suitable example of a current sensor 110b includes a current transformer that is disposed in a current sensing relationship with the power line signal. These and other voltage and current sensors are known in the art.

The A/D conversion unit 112 may be any suitable analog-to-digital converter that is configured to sample the analog measurement signals generated by the sensor circuit 110. The A/D conversion unit 112 is operably coupled to provide the resulting digital measurement signals to the P&C circuit 115.

The P&C circuit 115 is a circuit that is configured to receive the digital measurement signals from the A/D conversion unit 112 and generate energy consumption data therefrom. According to an exemplary embodiment, the processing circuit 115 includes digital processing circuitry that processes the digitized measurement signals to thereby generate the energy consumption data. Such circuits are well known in the art. In addition, the P&C circuit 115 includes further functionality configured to exercise general supervisory control over data transmission, data display and data storage within the meter 10. In this embodiment, the P&C circuit 115 is also configured to control the service switch arrangement 104 as described herein.

Accordingly, the P&C circuit 115 performs energy data processing, as well as controller operations. In an alternative embodiment, the P&C circuit 115 may be split into two separate devices, such as a digital signal processor ("DSP") and a controller, to carry out these tasks.

The memory 121 of the chip package 113 includes one or more storage devices of different types. The memory 121 may include volatile or non-volatile RAM, EEPROM, or other readable and writeable memory device, any of which may be incorporated into the integrated circuit package 113. The memory 121 stores instructions and/or parameters used by the P&C circuit 115, and may further store energy consumption data. By contrast, the memory 125 is external to the chip package 113, and provides for extended data storage. Such memory 125 would also, however, be located within the housing 105.

The optical communication circuit 120 is operably coupled to the P&C circuit 115. The optical communication circuit 120 in this embodiment includes an optical transceiver, both of which are located at a translucent or transparent optical port, not shown. Similarly, the remote communication circuit 106 is operably coupled to the processing circuit 115. The remote communication circuit 106 may suitably be a power line modem, an RF transceiver, for example, a pager radio, or other wireless device that is capable of transmitting on a WAN, or on another wireless communication network.

The display 130 is operably coupled to the P&C circuit 115 and provides a visual display of information, such as information regarding the operation of the meter 100. For example, the display 130 may provide a visual display of information relating to the power measurement operations or energy consumption data of the meter 100.

The disconnect arrangement 104 includes a service switch 150, source of motive force 152, a storage element 154, a charging circuit 156, a first switch 158, a second switch 160. The service switch 150 is operably coupled to controllably interrupt and restore connections in the power lines 101 from the utility to the load. The source of motive force 152 may suitably be the same as the source of motive force of FIG. 1, and is connected to provide opening and closing force to the service switch 150. The storage element 154 may be the same as the energy storage element 24 of FIG. 1, and is operably connected to the source of motive force 152 via the first switch 158. The charging circuit 156 may suitably be the same as the charging circuit 26 of FIG. 1, and is operably connected to the energy storage element 154 via the second switch 160. The P&C circuit 115 may suitably perform substantially the same operations as that of the control circuit 28 of FIG. 1. The first switch 158 may suitably comprises, or at least constitutes a portion of, the direction control circuit 30 of FIG. 1, and the second switch 160 may suitably be the switch 32 of FIG. 1. Accordingly, the elements of the disconnect arrangement 104 are arranged with respect to each other in substantially the same manner as shown in FIG. 1.

The meter 100 also includes a power supply 111 operably connected to receive power from the power lines 101. The power supply 111 is configured to generate bias power for the circuitry of the meter 100 discussed above, including the chip package 113, the display 130, the communication circuits 106 and 120, and the charging circuit 156. The power supply 111 does not provide power directly to the source of motive force 152, but rather via the charging circuit 156 and the energy storage device 154.

In normal energy delivery operation, the service switch 150 is closed, and the utility thereby provides electrical service to the load via power lines 101. The metrology circuit 102 performs operations to detect electrical signals on the power lines 101 and generating metering information therefrom. Such operations are known in the art. In such normal operation, the switch 160 is open, thereby operably disconnecting the charging circuit 156 from the energy storage device 154. Similarly, the first switch 158 is open.

From time to time, it may be necessary for the electrical service to be disconnected from the load. In such a case, the P&C circuit 115 receives a command signal (i.e. a data signal with instruction data) from either the remote communication circuit 106 or the optical communication circuit 120 indicating that the service is to be disconnected.

Responsive to the command signal, the P&C circuit 115 generates a signal causing the switch 160 to operably connect the charging circuit 156 to the charge storage device 154. As a consequence, the charging circuit 156 charges the previously discharged charge storage device 154. After a short time sufficient to allow the charge storage device 154 to be charged, the P&C circuit 115 provides a signal to first switch 158 that causes connection of the charge storage device 154 to the source of motive force 152 such that the source of motive force 152 rotates in an "opening" direction. Such rotation causes the switch 150 to move from the closed state to the open state.

Once the switch 150 is open, the load has its electrical service disconnected. Thereafter, the service can be restored by closing the switch 150 in any suitable manner, including that discussed above in connection with FIG. 1.

FIG. 3 shows in further detail a schematic diagram of an alternative service switch arrangement 300. The service switch arrangement 300 of FIG. 3 includes many of the same elements as the service switch arrangement 10 of FIG. 1. In particular, the arrangement 300 of FIG. 3 includes a service switch 16, an electrically powered source of motive force 22, an energy storage device 24, a charging circuit 26, a processing and control circuit 28 and a direction control circuit 30. In contrast to FIG. 1, however, the function of the switch 32 is carried out by separate switching arrangements within the direction control circuit 30 and a separate charging circuit enabling switch 306, discussed further below. The arrangement of FIG. 3 allows for various alternatives of operation that provide protection against inadvertent opening of the service switch 16.

In FIG. 3, the service switch 16 is preferably a relay or other switch. The source of motive force 22 may suitably be a DC motor 302. The DC motor 302 may be a model SP3050 available from Rotalink. The DC motor has positive and negative terminals operably connected to the direction control circuit 30. The energy storage device 24 is a capacitor 304 having a first terminal 304a and a second terminal 304b, the second terminal 304b connected to circuit ground.

The charging circuit 26 includes a voltage doubler-type circuit 310 and voltage regulator-type circuit 312 coupled to the secondary winding of a transformer, not shown, of the meter power supply, not shown. Power supply transformers for meters are known in the art. The voltage doubler circuit 310 includes a capacitor C17 series coupled between the first terminal 314 of the winding of the power supply transformer, and the emitter of a PNP transistor Q11. The voltage doubler circuit 310 also includes a diode D18 reverse-bias connected between the emitter of the PNP transistor Q11 and the second terminal 316 of the power supply transformer winding. A resistor R131 is coupled between the base of the transistor Q11 and the second terminal 316. It will be appreciated that those of ordinary skill in the art may readily devise their own suitable charging circuit.

The collector output of the transistor Q11 is connected to the regulator circuit 312 via a forward biased diode D20. Specifically, the forward biased diode D20 is coupled to a collector of an NPN transistor Q10. As with a normal voltage regulator, a resistor R132 is coupled between the base and collector of the transistor Q10. A Zener diode D17 is coupled between the based of the transistor Q10 and ground, and a diode D19 is forward bias connected from the emitter to the base of the transistor Q10.

The control circuit 28 may suitably be any processor within the meter, such as the P&C circuit 115 of the chip package 113 of FIG. 2. The control circuit 28 includes an OPEN line output and a CLOSE line output. It will be appreciated that FIG. 3 only shows the outputs of the control circuit 28 relevant to the arrangement 300. If the control circuit 28 is the main metering processing element, such as the P&C circuit 115 of FIG. 2, then the control circuit 28 will include many more outputs and connections to other metering elements which would be known to those of ordinary skill in the art.

For the operations of the arrangement 300, the control circuit 28 in one embodiment has three states: an open (first) state, a close (second) state, and a charging (third) state. In the open state, the OPEN line is at a "low" logic level and the CLOSE line is at a "high" logic level. In the close state, the OPEN line is at a "high" logic level and the CLOSE line is at a "low" logic level. In the charging state, the OPEN line is at a "high" logic level and the CLOSE line is at a "high" logic level.

In general, the control circuit 28 is operable to receive an open switch command and a close switch command and generate corresponding sequences of outputs on the OPEN and CLOSE signal lines responsive thereto. To this end, the control circuit 28 may receive open and close switch commands via software functions within the control circuit 28 itself. As discussed above, the open and/or close switch commands may be externally originated, or generated internally by operation of the control circuit 28.

The control circuit 28 is configured to, in response to an open switch command, place the lines OPEN and CLOSE in the charging state for a short time, and then place the lines OPEN and CLOSE in the open state. The control circuit 28 is further configured to, in response to a close switch command, place the lines OPEN and CLOSE in the charge state for a short time, and then place the lines OPEN and CLOSE in the close state.

The signal lines OPEN and CLOSE are further coupled to the direction control circuit 30. The direction control circuit 30 in this embodiment includes open input transistors Q4 and Q9, and close input transistors Q5 and Q8. The signal line OPEN is coupled to the base of the input transistor Q4, and the signal line CLOSE is coupled to the base of the input transistor Q5. The collectors of the transistors Q5 and Q4 are connected to a positive bias voltage through load transistors R129 and R130, respectively. The emitters of the transistors Q4 and Q5 are connected to ground. The values of R129 and R130 may each be 10K-ohms. The collectors of transistors Q4 and Q5 are operably connected to bases of respective transistors Q9 and Q8. The emitters of transistors Q8 and Q9 are connected to ground. The collectors of transistors Q8 and Q9 are connected, respectively, to positive and negative inputs of the motor 302.

The direction control circuit 30 also includes two PNP transistors Q6 and Q7 having emitters coupled to the terminal 304a of the capacitor 304. The collectors of the PNP transistors Q6 and Q7 are coupled, respectively, to the collectors of the transistors Q9 and Q8. A resistor R121 is series-connected between the base of transistor Q7 and the collector of transistor Q9. A resistor R122 is series-connected between the base of transistor Q6 and the collector of transistor Q8. In this embodiment, each of the resistors R121 and R122 is 10K-ohms.

Referring again to the charging circuit 26, the charging circuit 26 further includes a control input 308 that is connected to the charging circuit enabling switch 306. The control input 308 is connected to the base of the regulator transistor Q10. The charging circuit enabling switch 306, similar to the switch 32 of FIG. 1, is configured to operably connect and disconnect the charging circuit 26 to and from the capacitor 304a. In particular, the switch 306 is configured to controllably pull the base of the voltage regulator transistor Q10 to ground, thereby effectively disconnecting the voltage doubler 310 from the capacitor 304. To this end, the switch 306 is an NPN transistor Q12 having a collector connected to the control input 308, an emitter connected to ground, and a base operably connected to a signal line OPEN' and a signal line CLOSE'.

Specifically, the signal lines OPEN' and CLOSE' are operably coupled respective to signal lines in the direction control circuit 30. In general, the OPEN' and CLOSE' signal lines are logical complements of the OPEN and CLOSE signal lines, respectively, of the control circuit 28. In the embodiment described herein, the OPEN' line is coupled to the collector of the transistor Q4, and the CLOSE' line is coupled to the collector of the transistor Q5.

The OPEN' line is further connected to an OR junction 318 via a diode D21. Similarly, the signal line CLOSE' is further connected to the OR junction 318 via a diode D22. The OR junction 318 is coupled to the base of the transistor Q12 through a series resistor R150. In this exemplary embodiment the resistor R150 has a value of 10K-ohms.

In operation, the control circuit 28 operates in three states as discussed above. In a first or open state, the signal on line OPEN is at a logic low level, such as zero volts, and line CLOSE is at a logic high level, such as three volts. The first state is associated with both opening the switch 16, and a steady state after the switch 16 has been opened. In a second or close state, the signal on line OPEN is at a logic high level, such as three volts, and line CLOSE is at a logic low level, such as zero volts. The second state is associated with both closing the switch 16, and a steady state after the switch 16 has been closed. In a third or charge state, the signal on lines OPEN and CLOSE are both logic high levels, such as three volts. This state is associated with charging the capacitor 304.

In normal metering operation, the switch 16 is normally closed, which corresponds to the second state described above. In the second or close state, when the switch 16 is closed and in a steady state, the line CLOSE is at a low logic level and the line OPEN is at a high logic level. As will be discussed further below in detail, these signals cause the charging circuit 26 to be disconnected from the capacitor 304 and the capacitor 304 to be operably connected to the motor 302 and drive stage 320. In the steady state with the switch 16 closed, however, the capacitor 304 is discharged and the motor 302 does not operate even though the capacitor 304 is effectively connected thereto.

When the control circuit 28 receives or generates a command to open the service switch 16, the control circuit 28 first changes the signal on line CLOSE to high logic level, thereby entering the third state that charges the capacitor 304. After a suitable charging time, the control circuit 28 changes the signal on line OPEN to a low logic level, thereby entering the first state, which opens the switch 16.

Specifically, when the control circuit 28 changes the signal on line CLOSE to a high logic level, it results in both the OPEN and CLOSE signal lines being at the high logic level, and thus in the "charging" state. As a consequence, the transistors Q4 and Q5 both turn on. When the transistors Q4 and Q5 turn on, the collectors of Q4 and Q5 are pulled down to ground. As a consequence, the base voltage of transistors Q8 and Q9 is insufficient to turn on those transistors. Because transistors Q8 and Q9 are turned off, there is no path from the capacitor 304 to ground via the motor 302. Accordingly, the motor 302 does not operate.

However, the low voltage at the collectors of transistors Q4 and Q5 also constitutes a low logic level on the voltage on lines OPEN' and CLOSE'. As a result, the OR gate 318 is at a low voltage level, thus turning off the transistor switch 306. When the transistor 306 is turned off, the control input 308 of the charging circuit 26 is not pulled down, and hence the charging circuit 26 is operably coupled to provide a charging voltage to the capacitor 304. Thus, the control circuit 28, by providing high logic signals on both the OPEN and CLOSE signal lines, causes the charging circuit 26 to be operably connected to the capacitor 304.

After charging for a short time, the control circuit 28 transitions the OPEN signal line to a low logic level, thereby turning the transistor Q4 off. As a result, a high logic level is present at the collector of the transistor Q4, and thus on the OPEN' line. The high logic level on the OPEN' line propagates to the OR gate 318, which turns on the transistor switch 306. When the transistor switch 306 turns on, the control input 308 is pulled to ground, effectively disconnecting the charging circuit 26 from the capacitor 304.

In addition, the high voltage at the collector of transistor Q4 provides a sufficient base voltage to turn on the transistor Q9. As a result, the transistor Q9 completes a circuit from the capacitor 304 to ground through the motor 302. As the transistor Q9 turns on, it pulls the base of the transistor Q7 low, turning that transistor Q7 on. As such, a direct path of current is provided between the capacitor 304 and ground through the collector/emitter path of the transistor Q7, the motor 302, and the collector/emitter path of the transistor Q9. This direct path operates the motor 302. The motor 302 operates to open the switch 16.

Thereafter, when the control circuit 28 receives a command to restore power, i.e. close the service switch 16, the control circuit 28 first changes the signal on line OPEN to high logic level, thereby entering the third state that charges the capacitor 304. After a suitable charging time, the control circuit 28 changes the signal on line CLOSE to a low logic level, thereby entering the second state wherein the switch 16 is closed.

Specifically, when the control circuit 28 changes the signal on line OPEN to a high logic level, it results in both the OPEN and CLOSE signal lines being at the high logic level, and thus in the charging state. As discussed above, when the OPEN and CLOSE signal lines are at the high logic level, the switch 306 is turned off. As a result, the control input 308 of the charging circuit 26 is not pulled to ground. The charging circuit 26 is thereby effectively connected to the capacitor 304.

After charging, the control circuit 28 transitions the CLOSE signal line to a low logic level, thereby turning the transistor Q5 off. As a result, a high logic level is present at the collector of the transistor Q5, and thus on the OPEN' line. The high logic level on the OPEN' line propagates to the OR gate 318, which turns on the transistor switch 306. When the transistor switch 306 turns on, the control input 308 is pulled to ground, effectively disconnecting the charging circuit 26 from the capacitor 304.

In addition, the high voltage at the collector of transistor Q5 provides a sufficient base voltage to turn on the transistor Q8. As a result, the transistor Q8 completes a circuit from the capacitor 304 to ground through the motor 302. Specifically, when the transistor Q8 turns on, it pulls the base of the transistor Q6 low, turning on the transistor Q6. As such, a direct path of current is provided between the capacitor 304 and ground through the collector/emitter path of the transistor Q6, the motor 302, and the collector/emitter path of the transistor Q8. This direct path operates the motor 302, although in the opposite direction that results from the direct path through the transistors Q7 and Q9, discussed above. The motor 302 thereby operates to close the switch 16.

Thus, the arrangement of FIG. 3 employs a sequence of signals to operate the switch 16. To open the switch 16, the control circuit 28 provides at first high logic signals on both the OPEN and CLOSE signal lines, and then provides another signal whereby the OPEN signal is pulled low, and the CLOSE line remains high. Accordingly, it would be difficult for a malfunction to result in those two operations occurring in sequence.

It will be appreciated that the above-describe embodiments are merely exemplary, and that those of ordinary skill in the art may readily devise their own implementations and adaptations that incorporate the principles of the present invention and fall within the spirit and scope thereof. For example, although the embodiment of FIG. 3 shows the use of bipolar transistors Q6, Q7, Q8 and Q9 for the control of current through the motor 302, it will be appreciated that an alternative embodiment may instead employ suitably arranged field effect transistors.

In another alternative, the control circuit 28 of FIG. 3 returns to the third state (charge state) in sequence after either opening or closing the switch 16. In such a case, a predetermined sequence is still required for ongoing operation of the device, and can therefore provide at least some protection against errant ongoing operation.

I claim:

1. An arrangement for controllably disconnecting a utility power service from a load, comprising:
    a utility meter housing including metrology circuitry configured to generate metering information regarding electrical power provided to the load;
    a service switch configured to controllably interrupt a connection between the utility power service and the load;
    an electrically-powered source of motive force configured to cause the service switch to controllably interrupt the connection between the utility power service and the load;
    an energy storage device configured to provide power to the electrically-powered source of motive force;
    a charging circuit configured to provide charging energy to the energy storage device, wherein the energy storage device is configured to provide sufficient power to the electrically-power source of motive force after being at least partially charged by the charging circuit;
    a control circuit configured to provide a first signal to a first switch operably connecting the energy storage device to the electrically powered source of motive force, and to provide a second signal to a second switch operably connecting the charging circuit to the energy storage device, wherein the control circuit is configured to receive a disconnect command signal, and to provide the second signal and the first signal in sequence responsive to receiving the disconnect command signal.

2. The arrangement of claim 1, wherein the charging circuit comprises a voltage doubler circuit.

3. The arrangement of claim 1, wherein the first switch is a first transistor, and wherein the second switch is a second transistor.

4. The arrangement of claim 1, wherein the electrically-powered source of motive force comprises a DC motor.

5. The arrangement of claim 1, wherein control circuit is further configured to perform energy metering calculations.

6. The arrangement of claim 1, wherein the metrology circuit includes voltage and current sensors.

* * * * *